US010650681B2

(12) United States Patent
Tanigawa et al.

(10) Patent No.: US 10,650,681 B2
(45) Date of Patent: May 12, 2020

(54) PARKING POSITION IDENTIFICATION METHOD, PARKING POSITION LEARNING METHOD, PARKING POSITION IDENTIFICATION SYSTEM, PARKING POSITION LEARNING DEVICE, AND NON-TRANSITORY RECORDING MEDIUM FOR RECORDING PROGRAM

(71) Applicant: Panasonic Intellectual Property Corporation of America, Torrance, CA (US)

(72) Inventors: Toru Tanigawa, Osaka (JP); Yukie Shoda, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 216 days.

(21) Appl. No.: 15/671,767

(22) Filed: Aug. 8, 2017

(65) Prior Publication Data
US 2018/0068564 A1 Mar. 8, 2018

(30) Foreign Application Priority Data
Sep. 5, 2016 (JP) .................. 2016-173177

(51) Int. Cl.
*G06K 9/00* (2006.01)
*G08G 1/14* (2006.01)
(Continued)

(52) U.S. Cl.
CPC ......... *G08G 1/146* (2013.01); *G06K 9/00812* (2013.01); *G06K 9/6256* (2013.01);
(Continued)

(58) Field of Classification Search
CPC ........ G08G 1/146; G08G 1/147; G08G 1/143; G08G 1/0141; G08G 1/0129; G08G 1/0112; G06K 9/00; G06K 9/00791; G06T 7/70; G06T 7/73; G06T 2207/20081; G06T 2207/20084; G06T 2207/30264;
(Continued)

(56) References Cited

U.S. PATENT DOCUMENTS

2014/0112542 A1* 4/2014 Choi .................. G06K 9/00812
382/104
2014/0347196 A1* 11/2014 Schulz ............. G08G 1/096716
340/932.2

(Continued)

FOREIGN PATENT DOCUMENTS

JP 2006-160194 6/2006

*Primary Examiner* — Tom Y Lu
(74) *Attorney, Agent, or Firm* — Greenblum & Bernstein, P.L.C.

(57) ABSTRACT

A parking position identification method includes acquiring input data as an image that is generated by photographing a parking region by a camera which is installed in a target vehicle, and identifying a parking position of the target vehicle in the photographed parking region by inputting the input data to a learning model that indicates a relationship between the parking region which has a width in which parking of at least one vehicle is feasible and a parking position for one vehicle in the parking region.

14 Claims, 12 Drawing Sheets

(51) Int. Cl.
*G08G 1/01* (2006.01)
*G06T 7/70* (2017.01)
*G06K 9/62* (2006.01)
*G06T 7/73* (2017.01)
*G06N 3/08* (2006.01)
*B60W 30/06* (2006.01)
*G05D 1/02* (2020.01)

(52) U.S. Cl.
CPC .............. *G06N 3/08* (2013.01); *G06T 7/70* (2017.01); *G06T 7/73* (2017.01); *G08G 1/0112* (2013.01); *G08G 1/0129* (2013.01); *G08G 1/0141* (2013.01); *G08G 1/143* (2013.01); *G08G 1/147* (2013.01); *B60W 30/06* (2013.01); *G05D 1/0221* (2013.01); *G05D 1/0246* (2013.01); *G06T 2207/10004* (2013.01); *G06T 2207/20081* (2013.01); *G06T 2207/20084* (2013.01); *G06T 2207/30264* (2013.01)

(58) Field of Classification Search
CPC ............ G06T 2207/10004; G06N 3/08; G05D 1/0221; G05D 1/0246; B60W 30/06
See application file for complete search history.

(56) References Cited

U.S. PATENT DOCUMENTS

| | | | |
|---|---|---|---|
| 2015/0042808 A1* | 2/2015 | Pflug | G06K 9/00791 348/148 |
| 2015/0344028 A1* | 12/2015 | Gieseke | B60W 30/095 701/1 |
| 2017/0015312 A1* | 1/2017 | Latotzki | B60W 30/06 |
| 2017/0017848 A1* | 1/2017 | Gupta | B60W 30/06 |
| 2017/0053192 A1* | 2/2017 | Ding | G06K 9/00785 |
| 2018/0370566 A1* | 12/2018 | Kojo | B60R 21/00 |

* cited by examiner

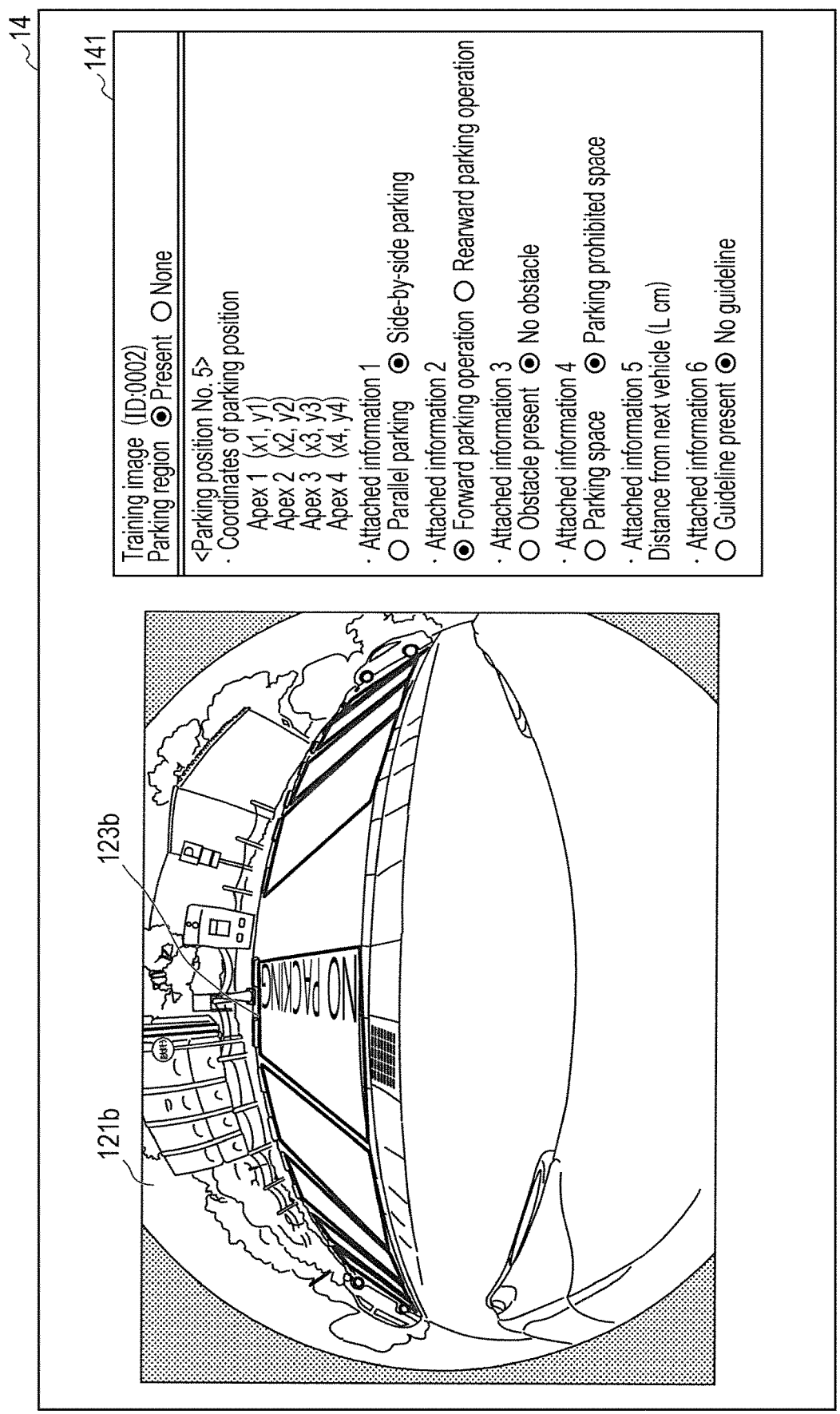

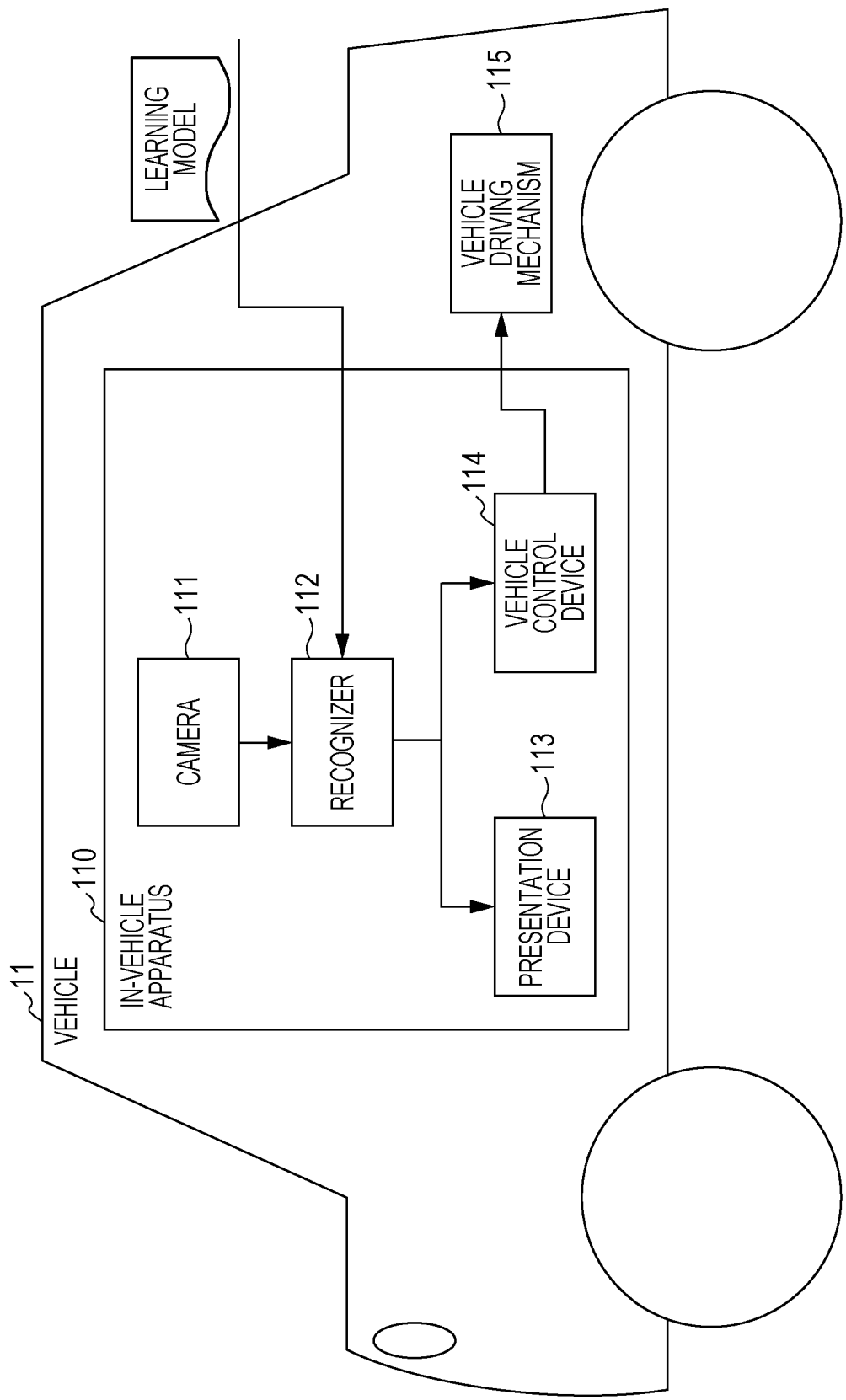

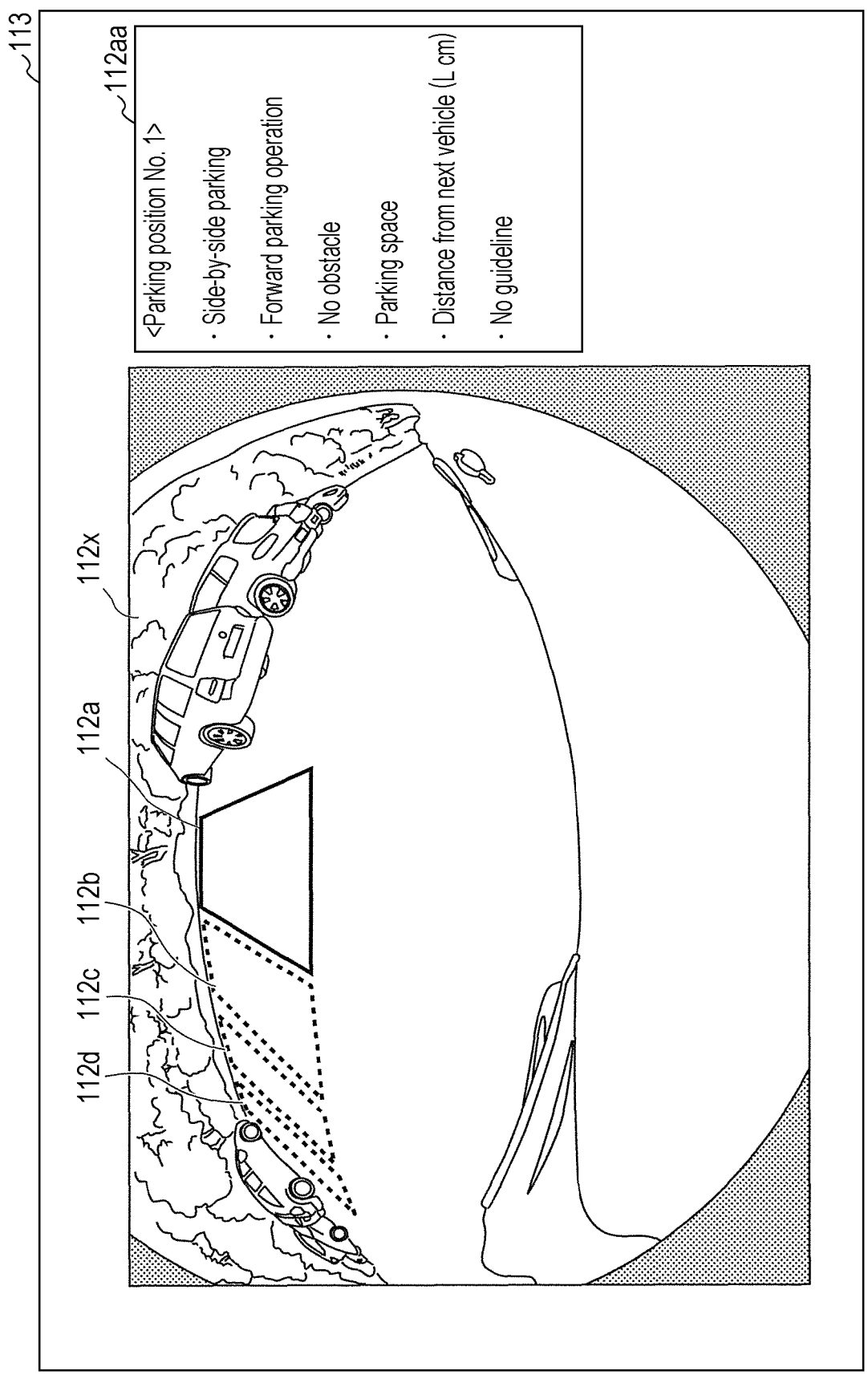

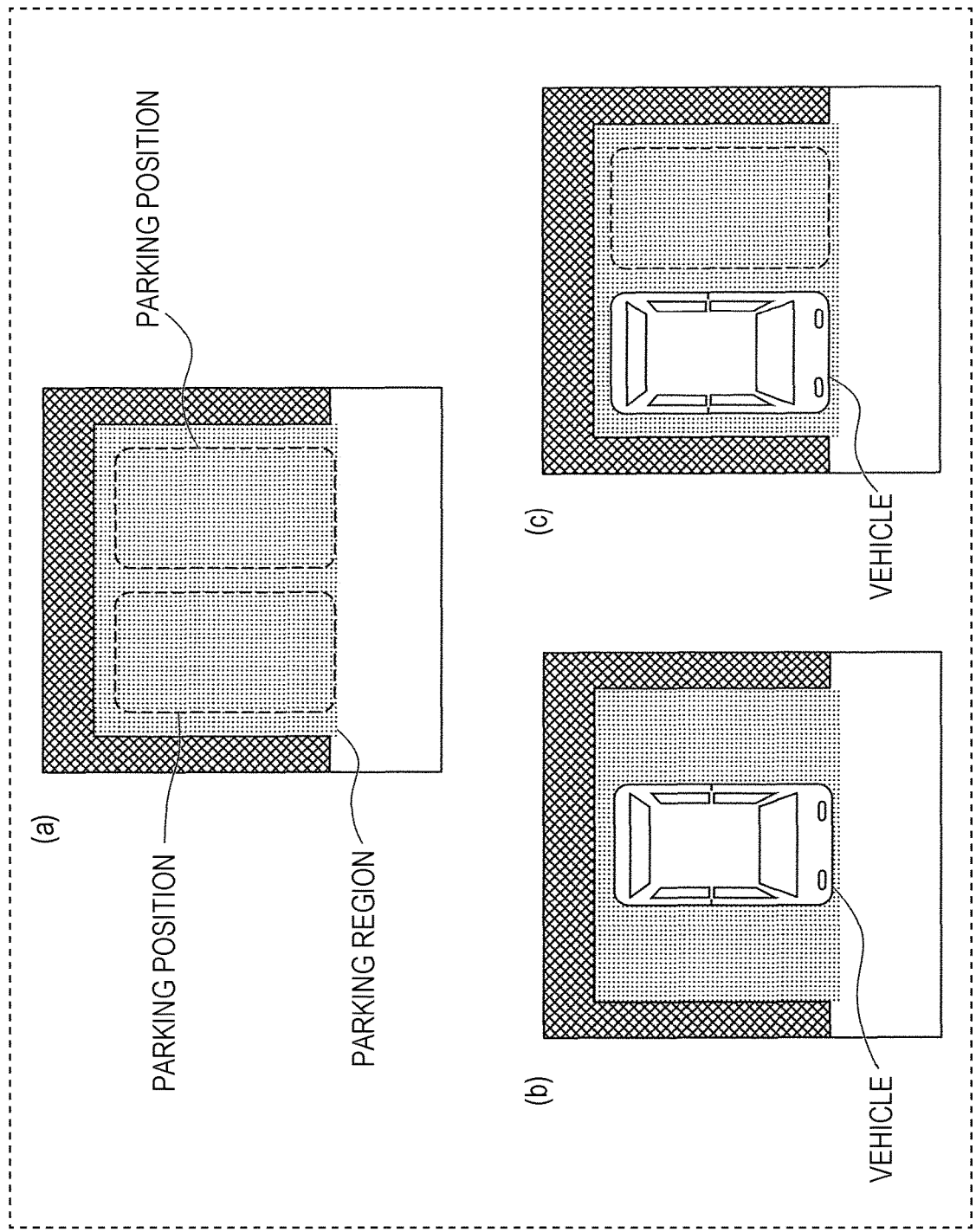

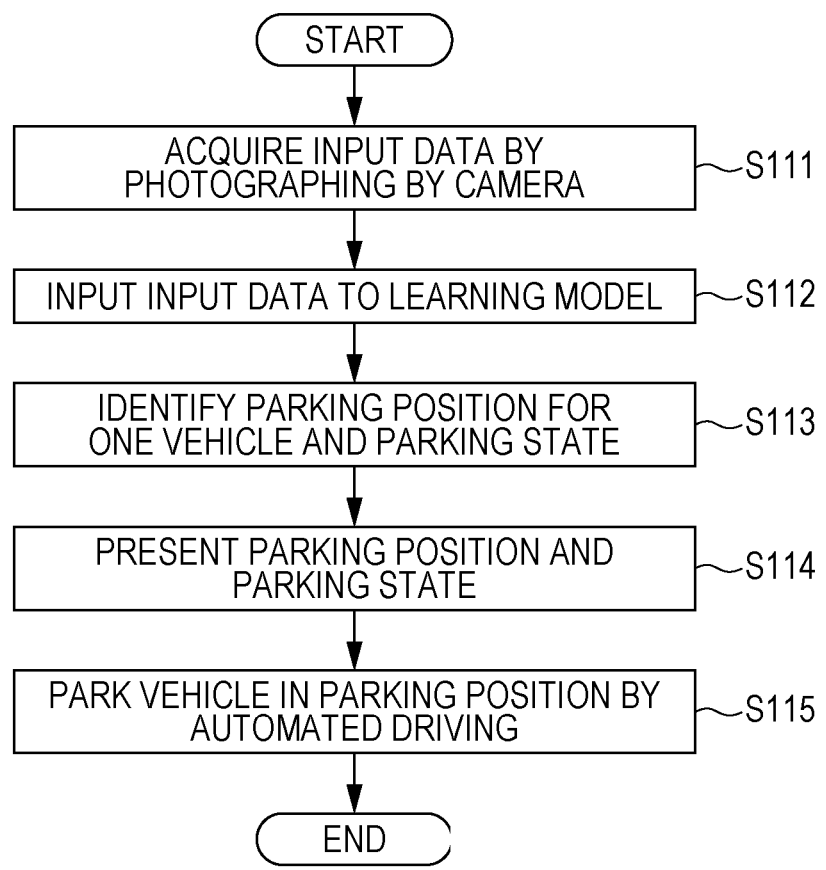

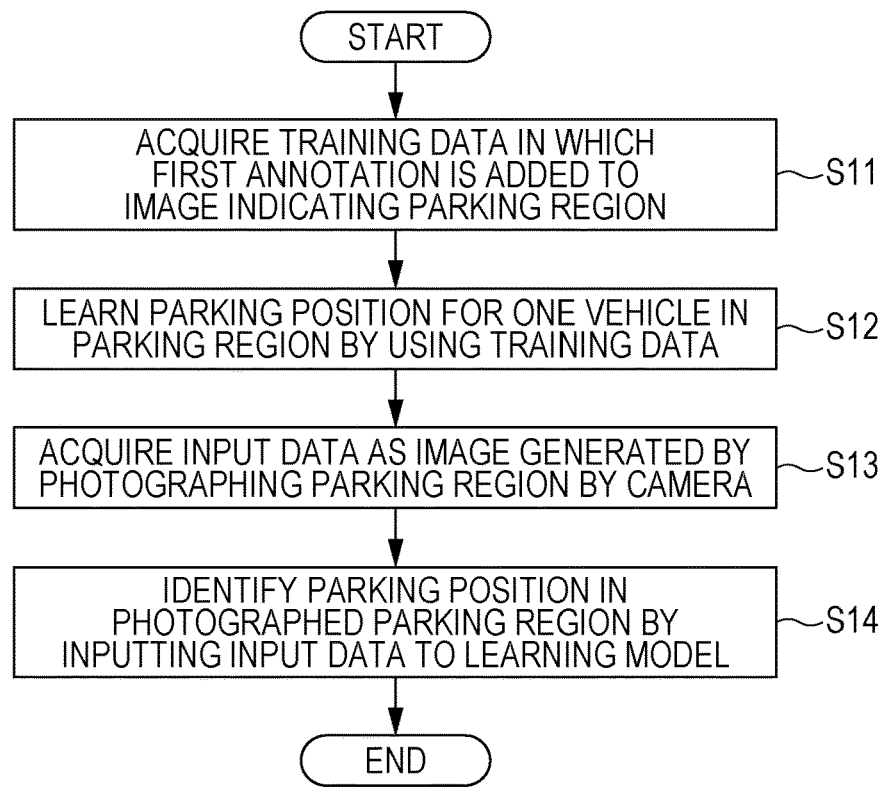
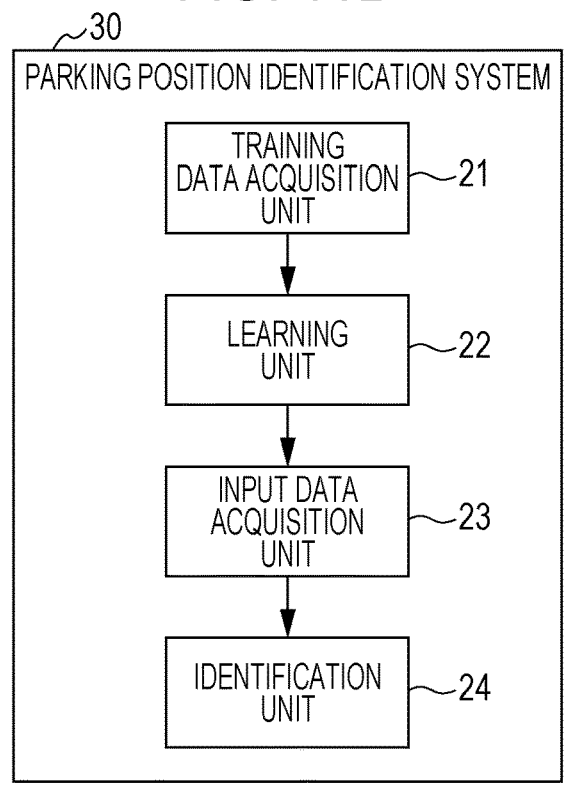

US 10,650,681 B2

PARKING POSITION IDENTIFICATION METHOD, PARKING POSITION LEARNING METHOD, PARKING POSITION IDENTIFICATION SYSTEM, PARKING POSITION LEARNING DEVICE, AND NON-TRANSITORY RECORDING MEDIUM FOR RECORDING PROGRAM

BACKGROUND

1. Technical Field

The present disclosure relates to a parking position identification method of identifying a parking position of a vehicle, a parking position learning method of learning a parking position, and so forth.

2. Description of the Related Art

In a case where a driver of a vehicle parks the vehicle at a parking area and where a mark such as a white line is present in the parking area, the driver recognizes a parking position in accordance with the mark and stops the vehicle at the parking position. However, in a case where the mark such as the while line is not present, it is difficult for the driver to determine where in the parking area to stop the vehicle.

Accordingly, a parking assisting device has been suggested which presents a parking position even in a case where the mark such as the white line is not present (for example, see Japanese Unexamined Patent Application Publication No. 2006-160194).

SUMMARY

However, the parking assisting device disclosed in above Japanese Unexamined Patent Application Publication No. 2006-160194 has a problem in that an appropriate parking position may not be identified.

One non-limiting and exemplary embodiment provides a parking position identification method that may identify an appropriate parking position and so forth.

In one general aspect, the techniques disclosed here feature a parking position identification method in which at least one computer identifies a parking position of a target vehicle, the parking position identification method including: acquiring input data as an image that is generated by photographing a parking region by a camera which is installed in the target vehicle; and identifying the parking position of the target vehicle in the photographed parking region by inputting the input data to a learning model that indicates a relationship between a parking region which has a width in which parking of at least one vehicle is feasible and a parking position for one vehicle in the parking region.

It should be noted that general or specific embodiments may be implemented as a system, a method, an integrated circuit, a computer program, a computer-readable recording medium such as a CD-ROM, or any selective combination thereof.

The parking position identification method of the present disclosure may identify an appropriate parking position.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram for explaining another example of the processing action of the training data acquisition unit in the embodiment;

FIG. 5 is a block diagram that illustrates a function configuration of a vehicle in the embodiment;

FIG. 6 is a diagram that illustrates one example of output data which are displayed by a presentation device in the embodiment;

FIG. 7 is a diagram for explaining one example of effects by the parking position identification system in the embodiment;

FIG. 8B is a flowchart that illustrates a processing action of an in-vehicle apparatus in the embodiment;

FIG. 11A is a flowchart that illustrates a parking position identification method according to another aspect of the present disclosure; and FIG. 11B is a block diagram that illustrates a function configuration of a parking position identification device according to one aspect of the present disclosure.

Figure 1:
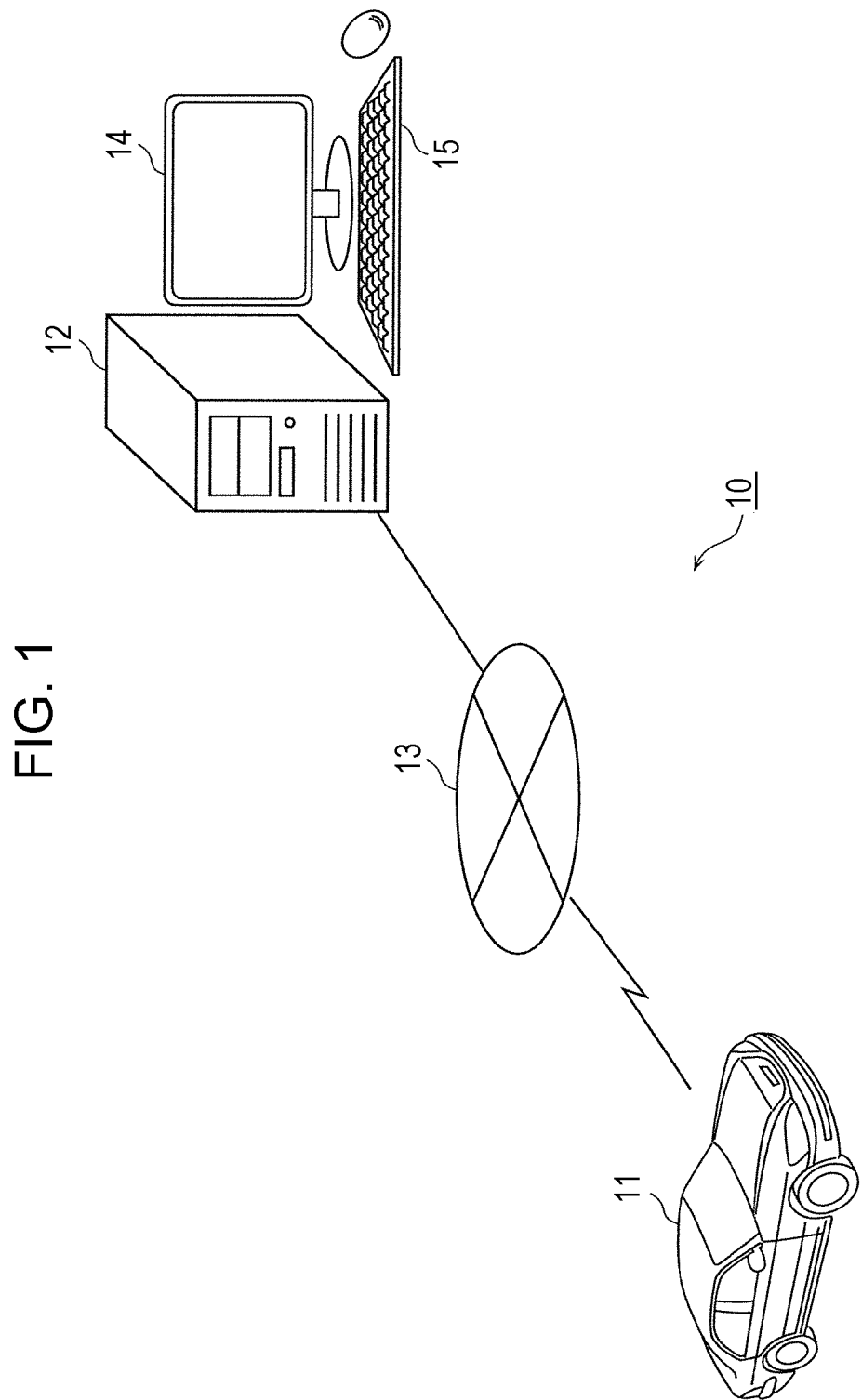
FIG. 1 is a diagram that illustrates a configuration of a parking position identification system in an embodiment.

DETAILED DESCRIPTION (Underlying Knowledge Forming Basis of the Present Disclosure)

The present inventor found that a parking assisting device of Japanese Unexamined Patent Application Publication No. 2006-160194 described in the section of "BACKGROUND" has the following problems.

That is, in a case where the parking assisting device identifies a parking position, an assessment is made whether or not a white line may be detected from an image obtained by photographing by a camera. Then, in a case where it is assessed that the white line may not be detected, the parking assisting device detects edges of seven other vehicles from the image. In a case where the detection of the edges may be made, the parking assisting device assesses whether or not a parking position to park a subject vehicle is present in adjacent positions of the other vehicles.

Consequently, in a parking position identification method of the parking assisting device, a next space to the other vehicle is identified as the parking position.

However, the parking position identification method has a problem in that the parking position of the subject vehicle may not be identified unless other vehicles are parked in a parking area. Further, even in a case where the other vehicles are parked in the parking area, an inappropriate position may be identified as the parking position. For example, even in a case where there is a parking region that has the width in which two vehicles may be parked, the center of the parking region may be identified as the parking position. In such a case, when the subject vehicle is parked in the parking position, even in a case where the parking region has the width in which two vehicles may be parked, only one vehicle may be parked in the parking region.

To solve such problems, a parking position identification method according to one aspect of the present disclosure is a parking position identification method in which at least one computer identifies a parking position of a target vehicle, the parking position identification method including: acquiring input data as an image that is generated by photographing a parking region by a camera which is installed in the target vehicle; and identifying the parking position of the target vehicle in the photographed parking region by inputting the input data to a learning model that indicates a relationship between a parking region which has a width in which parking of at least one vehicle is feasible and a parking position for one vehicle in the parking region. For example, the learning model may be constructed by acquiring training data, in which a first annotation as information which indicates the parking position for one vehicle in the parking region is added to an image which indicates the parking region which has the width in which parking of at least one vehicle is feasible, and by learning the parking position for one vehicle in the parking region by using the training data. Further, the first annotation may indicate the parking position for one vehicle by coordinates.

Accordingly, the learning model, which is constructed by performing learning by using the training data which include the first annotation, that is, leaning of the parking position for one vehicle in the parking region, is used. That is, an appropriate parking position in the parking region is implanted in the learning model. For example, even in a case where the parking region does not have a mark such as a white line, an appropriate parking position in the parking region is implanted. Consequently, in a case where the camera of the target vehicle photographs the parking region, the parking position of the target vehicle in the photographed parking region may appropriately be identified by using the learning model. That is, even in a case where the parking region does not have the mark such as the white line, an appropriate parking position of the target vehicle in the parking region may be identified.

Further, in the acquiring of the training data, the training data, in which a second annotation as information which indicates a parking state in the parking position for one vehicle is further added to the image which indicates the parking region, may be acquired, the learning model may be constructed by further learning the parking state of the vehicle in the parking region by using the training data, and in the identifying of the parking position of the target vehicle, the input data may be input to the learning model to further identify the parking state in the parking position of the target vehicle.

Accordingly, the learning model, which is constructed by performing learning by using the training data which include the first and second annotations, that is, leaning of the parking position for one vehicle and the parking state in the parking region, is used. That is, appropriate parking position and parking state in the parking region are implanted in the learning model. For example, even in a case where the parking region does not have the mark such as the white line, appropriate parking position and parking state in the parking region are implanted. Consequently, in a case where the camera of the target vehicle photographs the parking region, the parking position and the parking state of the target vehicle in the photographed parking region may appropriately be identified by using the learning model. That is, even in a case where the parking region does not have the mark such as the white line, appropriate parking position and parking state of the target vehicle in the parking region may be identified.

Further, specifically, in a case where a doorway obstacle that is an obstacle to getting in and out the vehicle is present in a periphery of the parking position for one vehicle in the image that indicates the parking region, the second annotation may indicate a distance between the parking position for one vehicle and the doorway obstacle as the parking state, and in the identifying of the parking position of the target vehicle, in a case where the input data are input to the learning model to identify the parking position of the target vehicle in a periphery of the doorway obstacle that is imaged in the input data, a distance between the doorway obstacle that is imaged in the input data and the parking position of the target vehicle may be identified as the parking state in the parking position of the target vehicle. For example, the doorway obstacle may be a vehicle that is parked next to the parking position for one vehicle in the image that indicates the parking region.

Accordingly, the distance between the parking position for one vehicle and the doorway obstacle is implanted in the learning model as the parking state. Consequently, in a case where the camera of the target vehicle photographs the parking region and the parking position of the target vehicle is identified in the periphery of the doorway obstacle, the distance between the doorway obstacle and the parking position of the target vehicle may appropriately be identified as the parking state. Further, in a case where the distance is presented to a driver of the target vehicle, the driver may determine whether or not the target vehicle may be parked in the identified parking position based on the distance. That is, in a case where the distance is short and where the driver parks the target vehicle in the identified parking position, the driver may not get out the target vehicle because the doorway obstacle (for example, a next vehicle) becomes an obstacle. Consequently, in this case, the driver may determine that the driver may not park the target vehicle in the identified parking position.

Further, the second annotation may indicate parallel parking or side-by-side parking as the parking state in the parking position for one vehicle, and in the identifying of the parking position of the target vehicle, the input data may be input to the learning model to identify parallel parking or side-by-side parking as the parking state in the parking position of the target vehicle. Further, the second annotation may indicate forward entrance or rearward entrance as the parking state in the parking position for one vehicle, and in the identifying of the parking position of the target vehicle, the input data may be input to the learning model to identify forward entrance or rearward entrance as the parking state in the parking position of the target vehicle. Further, the second annotation may indicate whether or not parking is prohibited as the parking state in the parking position for one vehicle, and in the identifying of the parking position of the target vehicle, the input data may be input to the learning model to identify whether or not parking is prohibited as the parking state in the parking position of the target vehicle. Further, the second annotation may indicate whether or not a parking obstacle that is an obstacle to parking is present in the parking position for one vehicle as the parking state in the parking position for one vehicle, and in the identifying of the parking position of the target vehicle, the input data may be input to the learning model to identify whether or not the parking obstacle is present in the parking position of the target vehicle as the parking state in the parking position of the target vehicle.

Further, the learning model may be a neural network model.

Accordingly, many training data are acquired, and the accuracy of identifying an appropriate parking position may thereby be enhanced.

Further, a parking position learning method according to one aspect of the present disclosure may be a parking position learning method in which a computer learns a parking position of a target vehicle, the parking position learning method including: acquiring training data, in which a first annotation as information which indicates a parking position for one vehicle in a parking region is added to an image which indicates the parking region which has a width in which parking of at least one vehicle is feasible; and constructing a learning model by learning the parking position for one vehicle in the parking region by using the training data.

Accordingly, learning by using the training data that include the first annotation, that is, leaning of the parking position for one vehicle in the parking region is performed, and the learning model is thereby constructed. As a result, an appropriate parking position in the parking region may be implanted in the learning model.

It should be noted that general or specific embodiments may be implemented as a system, a method, an integrated circuit, a computer program, a computer-readable recording medium such as a CD-ROM, or any selective combination thereof.

An embodiment will hereinafter be described in detail with reference to drawings.

It should be noted that the embodiment described below illustrates general or specific examples. Values, shapes, materials, elements, arrangement positions or connection manners of elements, steps, orders of steps, and so forth that are described in the following embodiment are merely illustrative and are not intended to limit the present disclosure. Further, the elements that are not described in the independent claims that provide the most superordinate concepts among the elements in the following embodiment will be described as arbitrary elements.

Further, the diagrams are schematic diagrams and are not unnecessarily strictly illustrated. Further, the same reference characters are provided to the same elements in the diagrams.

Embodiment

FIG. 1 is a diagram that illustrates a configuration of a parking position identification system in this embodiment.

A parking position identification system 10 in this embodiment is a system that is formed with at least one computer and identifies a parking position of a vehicle 11 as a target vehicle. Specifically, the parking position identification system 10 includes an in-vehicle apparatus included in the vehicle 11 and a server 12 that is connected with the in-vehicle apparatus via a communication network 13 such as the Internet.

The in-vehicle apparatus of the vehicle 11 includes a camera and generates an image by photographing by the camera. Then, in a case where a parking region is imaged in the image, the in-vehicle apparatus identifies a parking position for one vehicle in the parking region. The parking region is a parking area, an open space, or the like that has the width in which at least one vehicle may be parked. The in-vehicle apparatus acquires a learning model from the server 12 via the communication network 13 in order to identify the parking position.

The server 12 is connected with a display device 14 and an input device 15 in a wired or wireless manner. The display device 14 has a liquid crystal display or an organic electroluminescence (EL) display and displays an image in accordance with control from the server 12. The input device 15 is formed with a keyboard, a mouse, and so forth, for example, and outputs an operation signal in accordance with an input operation by a user to the server 12.

Further, the server 12 acquires and saves an image transmitted from plural terminal devices via the communication network 13, for example. Specifically, the terminal device transmits an image that is obtained by photographing by the camera included in another vehicle than the vehicle 11 to the server 12 via the communication network 13, for example. The image that is transmitted to the server 12 and saved as described above is used as a training image, which will be described later.

The server 12 learns the parking position for one vehicle in the parking region by using the plural saved training images and thereby constructs a learning model. Then, the server 12 transmits the constructed learning model to the vehicle 11 via the communication network 13.

Figure 2:
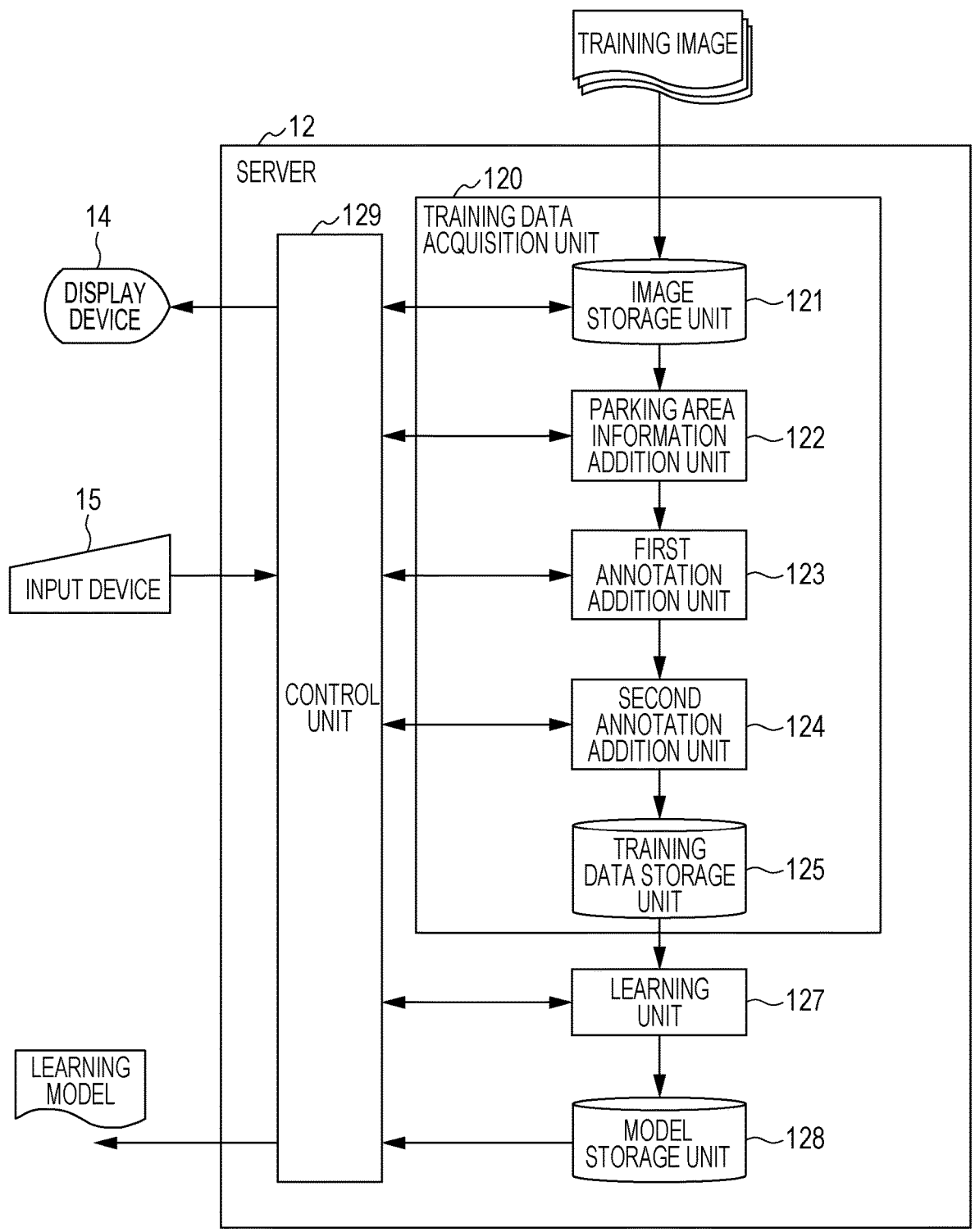
FIG. 2 is a block diagram that illustrates a function configuration of a server in the embodiment.

FIG. 2 is a block diagram that illustrates a function configuration of the server 12.

The server 12 includes a training data acquisition unit 120, a learning unit 127, a model storage unit 128, and a control unit 129.

The training data acquisition unit 120 acquires training data that are used for learning of the parking position. Specifically, the training data acquisition unit 120 adds a first annotation and a second annotation to an image that indicates a parking region which has the width in which at least one vehicle may be parked and thereby acquires the training data.

More specifically, the training data acquisition unit 120 includes an image storage unit 121, a parking area information addition unit 122, a first annotation addition unit 123, a second annotation addition unit 124, and a training data storage unit 125.

The image storage unit 121 is a recording medium for recording data such as a RAM or a hard disk. The image storage unit 121 stores plural images that are each generated by photographing by the camera, for example, as plural training images.

The parking area information addition unit 122 assess, with respect to each of the training images stored in the image storage unit 121, whether or not the parking region that has the width in which at least one vehicle may be parked is indicated in the training image. Then, in a case where it is assessed that the parking region is indicated in the image, the parking area information addition unit 122 adds parking area information to the training image. Note that the parking area information addition unit 122 may automatically perform an assessment about whether or not the parking region is indicated or may perform the assessment in accordance with an operation from the user. That is, the parking area information addition unit 122 may analyze the training image and may thereby automatically assess whether or not the parking region is indicated in the training image. Further, the parking area information addition unit 122 may acquire the operation signal from the input device 15 via the control unit 129 and may assess whether or not the parking region is indicated in the training image in accordance with the operation signal.

The first annotation addition unit 123 adds the first annotation to the training image to which the parking area information is added. The first annotation is information that indicates the parking position for one vehicle in the parking region indicated in the training image. Specifically, the first annotation addition unit 123 acquires the operation signal from the input device 15 via the control unit 129 and adds the first annotation to the training image in accordance with the operation signal.

The second annotation addition unit 124 further adds the second annotation that is information which indicates a parking state in the parking position for one vehicle to training image to which the parking area information and the first annotation are added. Specifically, the second annotation addition unit 124 acquires the operation signal from the input device 15 via the control unit 129 and adds the second annotation to the training image in accordance with the operation signal.

In addition, the second annotation addition unit 124 stores the training image to which the parking area information, the first annotation, and the second annotation are added as the training data in the training data storage unit 125. Accordingly, the training data are acquired.

The training data storage unit 125 is a recording medium for recording data such as a RAM or a hard disk. The training data storage unit 125 stores the training image to which the parking area information, the first annotation, and the second annotation are added as the training data.

The learning unit 127 learns the parking position by using the training data. That is, the learning unit 127 learns the parking position for one vehicle in the parking region by using the training data stored in the training data storage unit 125 and thereby constructs the learning model. The learning unit 127 stores the constructed learning model in the model storage unit 128. Specifically, the learning in the learning unit 127 is machine learning such as deep learning (neural network), a random forest, or a genetic programming. Further, graph cuts or the like may be used for recognition and segmentation of an object in an image. Alternatively, a recognizer or the like that is created by the random forest or genetic programming may be used.

The model storage unit 128 is a recording medium for recording data such as a RAM or a hard disk. The model storage unit 128 stores the learning model that is constructed by the learning unit 127.

The control unit 129 acquires the operation signal from the input device 15 and controls the training data acquisition unit 120, the learning unit 127, and the display device 14 in accordance with the operation signal.

Figure 3:
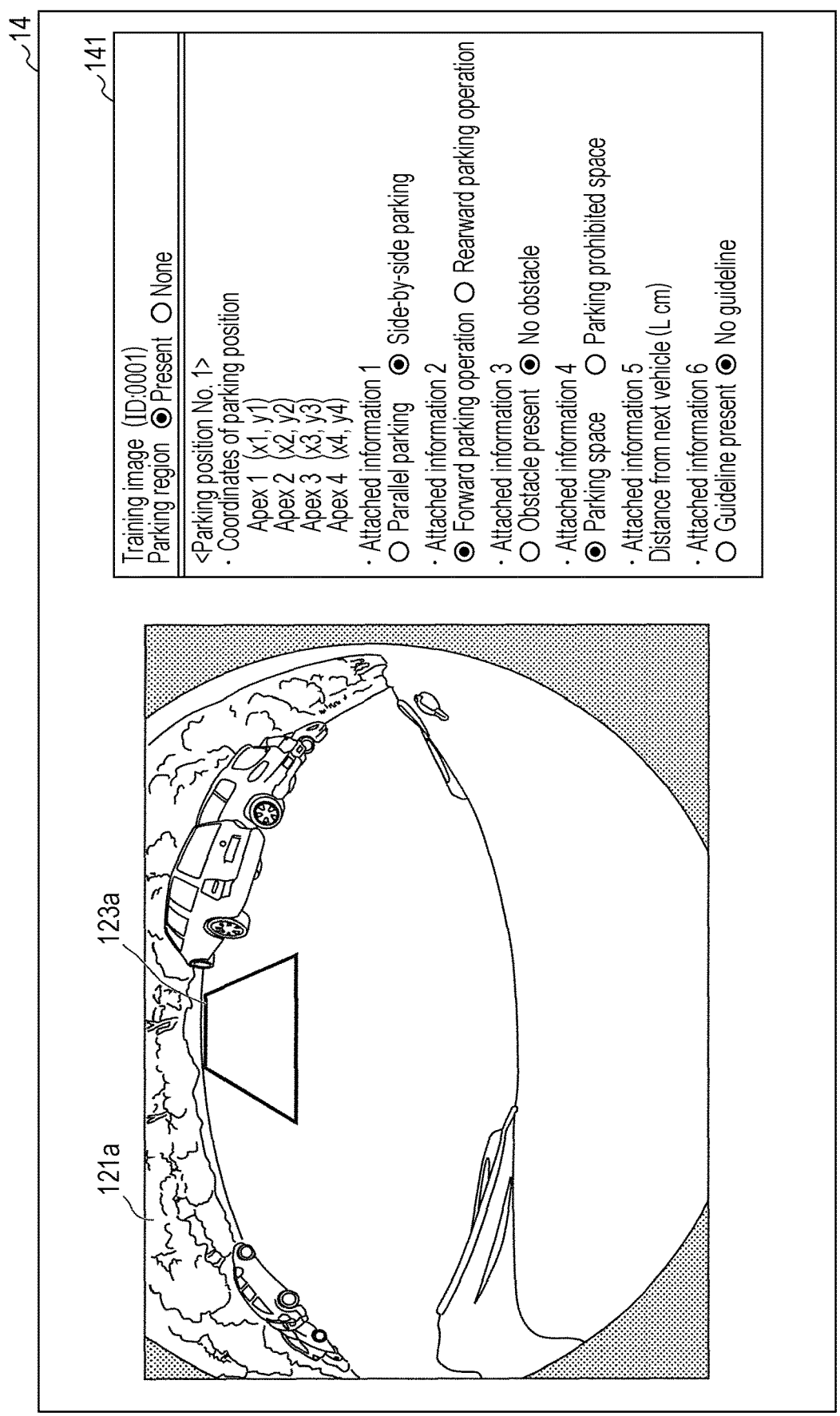
FIG. 3 is a diagram for explaining one example of a processing action of a training data acquisition unit in the embodiment.

FIG. 3 is a diagram for explaining one example of a processing action of the training data acquisition unit 120. Specifically, FIG. 3 illustrates an image that is indicated on the display device 14.

The control unit 129 causes the display device 14 to display a training image 121a stored in the image storage unit 121 and an information field 141 that corresponds to the training image 121a. As illustrated in FIG. 3, the training image 121a is an image that is obtained by photographing by an in-vehicle camera with a fisheye lens but may be an image that is obtained by photographing by a camera with another lens than the fisheye lens.

For example, the user of the server 12 determines whether or not the parking region is imaged in the training image 121a displayed on the display device 14. Then, in a case where the user determines that the parking region is imaged, the user operates the input device 15 and thereby selects a radio button that is associated with "present" of the parking region which is included in the information field 141. As a result, the parking area information addition unit 122 adds the parking area information to the training image 121a and outputs the training image 121a to which the parking area information is added to the first annotation addition unit 123.

Next, the user operates the input device 15 and thereby draws a frame 123a that indicates the parking position for one vehicle in the parking region on the training image 121a. The frame 123a is a red rectangle, for example. Further, specifically, the frame 123a is drawn by a drawing process by the control unit 129 in accordance with the operation signal from the input device 15.

In a case where such a frame 123a is drawn, the first annotation addition unit 123 adds the coordinates of the frame 123a in the training image 121a to the training image 121a. That is, the first annotation addition unit 123 adds the first annotation as the information that indicates the parking position for one vehicle in the parking region indicated in the training image 121a to the training image 121a. The coordinates of the frame 123a, that is, the first annotation is formed with the coordinates of the four apexes of the frame 123a, for example. The control unit 129 displays the respective coordinates of the four apexes (apex 1 to apex 4) as the coordinates of the parking position in the information field 141 of the display device 14.

Next, the user inputs the second annotation as the information that indicates the parking state in the parking position of the frame 123a to the server 12 by operating the input device 15. The control unit 129 displays the second annotation as attached information 1 to 6 in the information field 141 of the display device 14. Further, the second annotation addition unit 124 adds the second annotation to the training image 121a.

Specifically, the attached information 1 as the second annotation indicates parallel parking or side-by-side parking as the parking state in the parking position. For example, in a case where the parking state in the parking position is the side-by-side parking, the user operates the input device 15 and thereby selects a radio button that is associated with "side-by-side parking" of the attached information 1 included in the information field 141. As a result, the second annotation addition unit 124 adds the attached information 1 of "side-by-side parking" to the training image 121a.

The attached information 2 indicates forward entrance or rearward entrance as the parking state in the parking position (that is, "forward parking operation" or "rearward parking operation"). For example, in a case where the parking state in the parking position is the forward entrance, the user operates the input device 15 and thereby selects a radio button that is associated with "forward parking operation" of the attached information 2 included in the information field 141. As a result, the second annotation addition unit 124 adds the attached information 2 of "forward parking operation" to the training image 121a.

The attached information 3 indicates whether or not a parking obstacle is present in the parking position as the parking state in the parking position (that is, "obstacle present" or "no obstacle"). The parking obstacle is an article that is an obstacle to parking such as a road cone or a pylon, for example. Specifically, in a case where the parking obstacle is not present in the parking position, the user operates the input device 15 and thereby selects a radio button that is associated with "no obstacle" of the attached information 3 included in the information field 141. As a result, the second annotation addition unit 124 adds the attached information 3 of "no obstacle" to the training image 121*a*.

The attached information 4 indicates whether or not parking is prohibited as the parking state in the parking position (that is, "parking space" or "parking prohibited space"). Specifically, in a case where the characters of "NO PARKING", for example, are not drawn in the parking position, the user operates the input device 15 and thereby selects a radio button that is associated with "parking space" of the attached information 4 included in the information field 141. As a result, the second annotation addition unit 124 adds the attached information 4 of "parking space" to the training image 121*a*.

The attached information 5 indicates the distance between the parking position and a doorway obstacle as the parking state in the parking position. The doorway obstacle is a vehicle that is parked next to the parking position or the like, for example, and is an article that is an obstacle to getting in or out the vehicle. That is, in a case where the doorway obstacle is present in a periphery of the parking position in the training image 121*a*, the attached information 5 indicates the distance between the parking position and the doorway obstacle. Specifically, in a case where a vehicle that is the doorway obstacle is parked next to the parking position, the user operates the input device 15 and thereby inputs a distance L (cm). As a result, the second annotation addition unit 124 adds the attached information 5 of "distance L (cm)" to the training image 121*a*.

The attached information 6 indicates whether or not a guideline is present as the parking state in the parking position (that is, "guideline present" or "no guideline"). Specifically, in a case where the guideline such as the white line or the like, for example, is not drawn in the parking position, the user operates the input device 15 and thereby selects a radio button that is associated with "no guideline" of the attached information 6 included in the information field 141. As a result, the second annotation addition unit 124 adds the attached information 6 of "no guideline" to the training image 121*a*.

FIG. 4 is a diagram for explaining another example of the processing action of the training data acquisition unit 120. Specifically, FIG. 4 illustrates an image that is indicated on the display device 14.

The control unit 129 causes the display device 14 to display another training image 121*b* stored in the image storage unit 121 and the information field 141 that corresponds to the training image 121*b*. As illustrated in FIG. 4, the training image 121*b* is an image that is obtained by photographing by the in-vehicle camera with the fisheye lens but may be an image that is obtained by photographing by a camera with another lens than the fisheye lens, similarly to the training image 121*a* in FIG. 3.

As illustrated in FIG. 4, in a case where the parking region indicated by the training image 121*b* is wide, the user may operate the input device 15 and may thereby draw plural frames, each of which indicates the parking position for one vehicle, in the parking region on the training image 121*b*. That is, the first annotation addition unit 123 adds plural first annotations to the training image 121*b*.

In this case, the second annotation addition unit 124 adds the second annotation that indicates the parking state in the parking position for each of the parking positions indicated by the first annotations.

Further, for example, the user inputs the second annotation as the information that indicates the parking state in the parking position of a frame 123*b* drawn in the training image 121*b* to the server 12 by operating the input device 15. Here, "NO PARKING" is indicated in the parking position. Consequently, the second annotation addition unit 124 adds the attached information 4 of "parking prohibited space" as the second annotation to the training image 121*b* while associating the attached information 4 with the frame 123*b* (that is, the first annotation).

FIG. 5 is a block diagram that illustrates a function configuration of the vehicle 11.

The vehicle 11 includes an above-described in-vehicle apparatus 110 and a vehicle driving mechanism 115.

The in-vehicle apparatus 110 includes a camera 111, a recognizer 112, a presentation device 113, and a vehicle control device 114.

The camera 111 is installed in the vehicle 11 so as to photograph a front side, a left side, a right side, or a rear side of the vehicle 11, for example. Further, in a case where the camera 111 photographs the parking region, the camera 111 outputs input data as an image that is generated by the photographing to the recognizer 112.

The recognizer 112 acquires and retains the learning model from the server 12 via the communication network 13. The recognizer 112 acquires the input data as the image that is generated by photographing the parking region by the camera 111 installed in the vehicle 11. Here, the recognizer 112 inputs the input data to the learning model and thereby identifies the parking position and the parking state of the vehicle 11 in the photographed parking region. Specifically, the recognizer 112 identifies each of the distance between the doorway obstacle and the parking position, parallel parking or side-by-side parking, forward entrance or rearward entrance, whether or not parking is prohibited, and whether or not the parking obstacle is present as the parking state.

In addition, the recognizer 112 outputs output data that indicate the identified parking position and parking state to the presentation device 113 and the vehicle control device 114. For example, the output data are formed with a presentation image as input data in which a frame which indicates the identified parking position is superimposed and parking state information that indicates the identified parking state.

The presentation device 113 is configured as a liquid crystal display or an organic EL display, for example, and displays the output data in a case where the presentation device 113 acquires the output data from the recognizer 112. That is, the presentation device 113 displays the presentation image and the parking state information. Accordingly, the parking position of the vehicle 11 that is identified in the parking region photographed by the camera 111 is presented to a driver of the vehicle 11 by the presentation image. In addition, the parking state that is identified in the parking region is presented to the driver of the vehicle 11 by the parking state information.

In a case where the vehicle control device 114 acquires the output data from the recognizer 112, the vehicle control device 114 controls the vehicle driving mechanism 115 so that the vehicle 11 is parked in the position of the frame in the parking region indicated in the presentation image of the output data, that is, the identified parking position. The vehicle driving mechanism 115 is configured with an engine, axles, steering, and so forth and is a mechanism for causing the vehicle 11 to travel in an arbitrary direction. Control by such a vehicle control device 114 causes the vehicle 11 to automatically travel and park in the identified parking position and in the identified parking state.

FIG. 6 is a diagram that illustrates one example of the output data which are displayed by the presentation device 113.

The recognizer 112 inputs the input data to the learning model and thereby identifies plural parking positions and the parking states that correspond to the plural parking positions, for example. In this case, the recognizer 112 outputs output data that are formed with a presentation image 112x as the input data in which frames 112a to 112d which indicate the plural identified parking positions are superimposed and the pieces of the parking state information that indicate the parking states which correspond to the plural parking positions.

In a case where the presentation device 113 acquires the output data, the presentation device 113 displays the presentation image 112x included in the output data. Here, in a case where any of the frames (for example, the frame 112a) among the plural frames 112a to 112d is selected in accordance with an operation by the driver of the vehicle 11, the presentation device 113 changes display modes of the selected frame 112a and the frames 112b to 112d that are not selected. For example, the presentation device 113 indicates the selected frame 112a by red solid lines and indicates the frames 112b to 112d that are not selected by red broken lines. Then, the presentation device 113 displays parking state information 112aa of the parking position that corresponds to the frame 112a.

For example, the parking state information 112aa indicates each of side-by-side parking, forward entrance (that is, forward parking operation), no obstacle, parking space, distance L from next vehicle (cm), and no guideline as the parking state in the parking position of the frame 112a.

As described above, because the parking position is identified and the parking position is displayed as the frame 112a, the driver of the vehicle 11 may determine that the driver may park the vehicle 11 in the parking position even in a case where the mark such as the white line is not present. Further, as the parking state in the parking position, "side-by-side parking", "forward parking operation", "no obstacle", "parking space", "distance from next vehicle (L cm)", and "no guideline" are displayed. Consequently, the driver of the vehicle 11 may determine that the driver may park the vehicle 11 in the parking position in accordance with the displayed parking state. Further, because "distance from next vehicle (L cm)" is displayed, in a case where the distance is short, the driver may not get out the vehicle 11 that is parked in the parking position. Consequently, in such a case, the driver may select the other parking position.

FIG. 7 is a diagram for explaining one example of effects by the parking position identification system 10 in this embodiment.

For example, as indicated by broken lines in FIG. 7(a), even in a case the width of the parking region is a width in which two vehicles may be parked, there is a case where white lines that serve as marks for parking two vehicles are not provided in the parking region. In such a case, as illustrated in FIG. 7(b), the vehicle may park at the center of the parking region, and the width of the parking region may not efficiently used.

However, in the parking position identification system 10 in this embodiment, the first annotation addition unit 123 adds two first annotations to the image that indicates the parking region. Each of those first annotations is the information that indicates the parking position for one vehicle in the parking region. In addition, the second annotation addition unit 124 further adds the second annotation to each of the parking positions of the image that indicates the parking region. The second annotation is the information that indicates the parking state in the parking position for one vehicle. As a result, the training data are obtained. Further, the learning unit 127 learns the parking position for one vehicle in the parking region by using the training data and thereby constructs the learning model. The recognizer 112 of the vehicle 11 acquires the input data as the image that is generated by photographing the parking region by the camera 111 installed in the vehicle 11. Further, the recognizer 112 inputs the input data to the learning model and thereby identifies the parking position of the vehicle 11 in the photographed parking region.

As a result, as illustrated in FIG. 7(c), the recognizer 112 of the vehicle 11 identifies not one parking position but two parking positions from the parking region that has the width in which two vehicles may be parked. Accordingly, the vehicle 11 may park in either one of the parking positions. That is, two vehicles may be parked in the parking region, and the width of the parking region may efficiently be used. As described above, parking may be performed while an appropriate parking position is identified in the parking region.

Figure 8A:
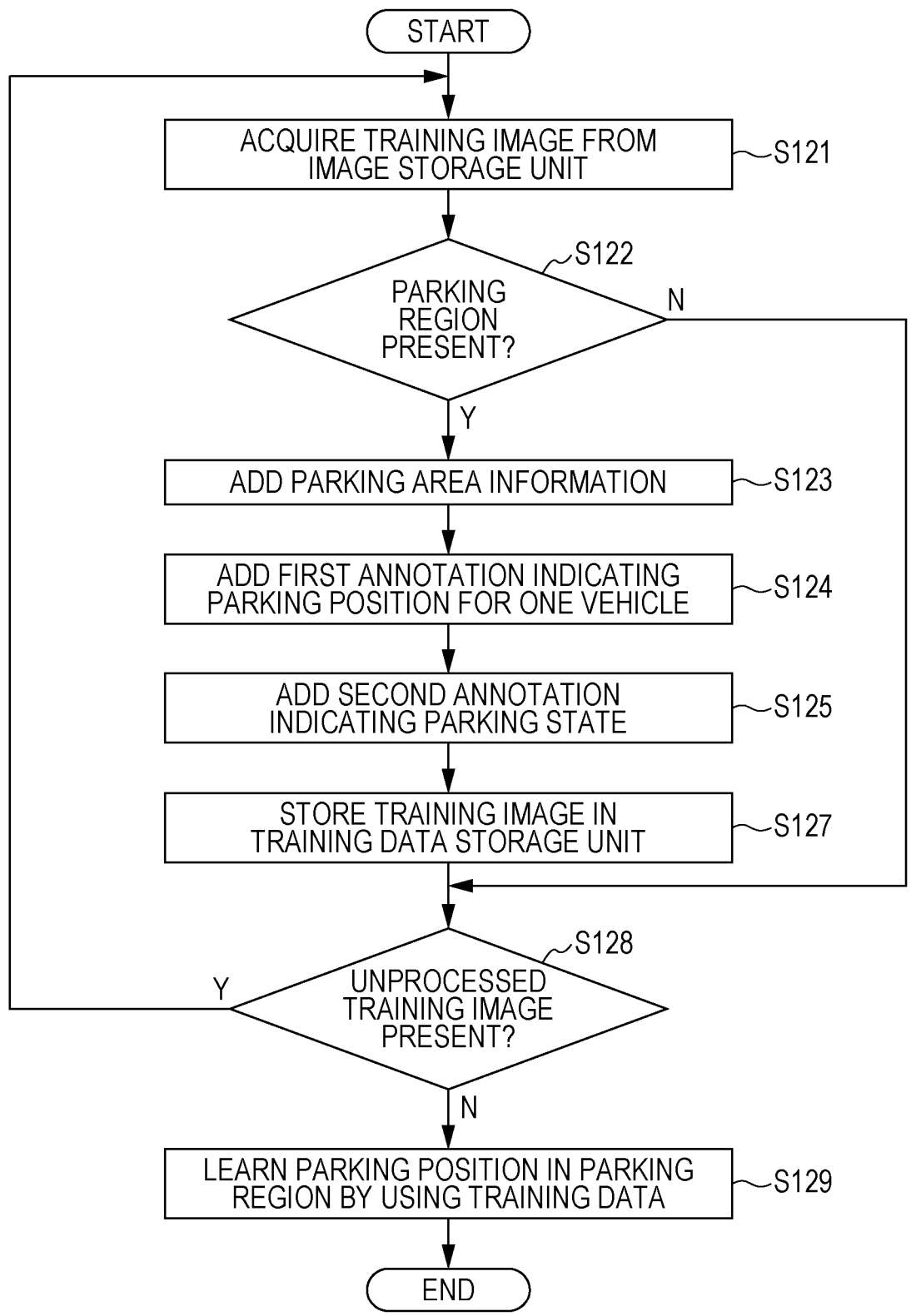
FIG. 8A is a flowchart that illustrates a processing action of the server in the embodiment.

FIG. 8A is a flowchart that illustrates a processing action of the server 12 in this embodiment.

The parking area information addition unit 122 of the server 12 first acquires the training image from the image storage unit 121 (step S121). Then, the parking area information addition unit 122 assesses whether or not the parking region is indicated in the training image by the operation signal or image processing (step S122). Here, in a case where it is assessed that the parking region is indicated (Y in step S122), the parking area information addition unit 122 adds the parking area information to the training image (step S123).

Next, the first annotation addition unit 123 further adds the first annotation as the information that indicates the parking position for one vehicle to the training image to which the parking area information is added (step S124). Note that the first annotation addition unit 123 adds plural first annotations. In addition, the second annotation addition unit 124 further adds the second annotation that indicates the parking state in the parking position to the training image to which the parking area information and the first annotation are added (step S125). In a case where the plural first annotations are added to the training image, the second annotation addition unit 124 adds the second annotations that indicate the respective parking states in the parking positions for the parking positions indicated by the first annotations. Then, the second annotation addition unit 124 stores the training image to which the parking area information, the first annotation, and the second annotation are added as the training data in the training data storage unit 125 (step S127).

Next, the control unit 129 assesses whether or not a training image for which an assessment is not made whether or not the parking region is present, that is, an unprocessed training image is present in the image storage unit 121 (step S128). Here, in a case where it is assessed that the unprocessed training image is present (Y in step S128), the server 12 repeatedly executes the process from the step S121. On the other hand, in a case where it is assessed that the unprocessed training image is not present (N in step S128), the learning unit 127 learns the parking position in the parking region by using all the training data stored in the training data storage unit 125. Accordingly, the learning unit 127 constructs the learning model of the parking position and stores the learning model in the model storage unit 128 (step S129).

FIG. 8B is a flowchart that illustrates a processing action of the in-vehicle apparatus 110 in this embodiment.

First, the camera 111 of the in-vehicle apparatus 110 acquires the input data by photographing (step S111). Next, the recognizer 112 inputs the input data to the learning model (step S112). The recognizer 112 obtains an output from the learning model and thereby identifies the parking position for one vehicle and the parking state in the parking region that is indicated in the input data (step S113).

The presentation device 113 presents the identified parking position and parking state (step S114). In addition, the vehicle control device 114 controls the vehicle driving mechanism 115, that is, performs automated driving and thereby causes the vehicle 11 to park in the identified parking position and in the identified parking state (step S115).

CONCLUSION

In the foregoing, a description has been made about the parking position identification method and so forth according to an aspect of the present disclosure based on the embodiment. However, the present disclosure is not limited to the embodiment. Embodiments to which various kinds of modifications conceived by persons having ordinary skill in the art are applied may be included in the scope of the present disclosure without departing from the gist of the present disclosure.

For example, in the above embodiment, the parking area information and the second annotation are added. However, without adding those pieces of information, only the first annotation may be added.

Figure 9A:
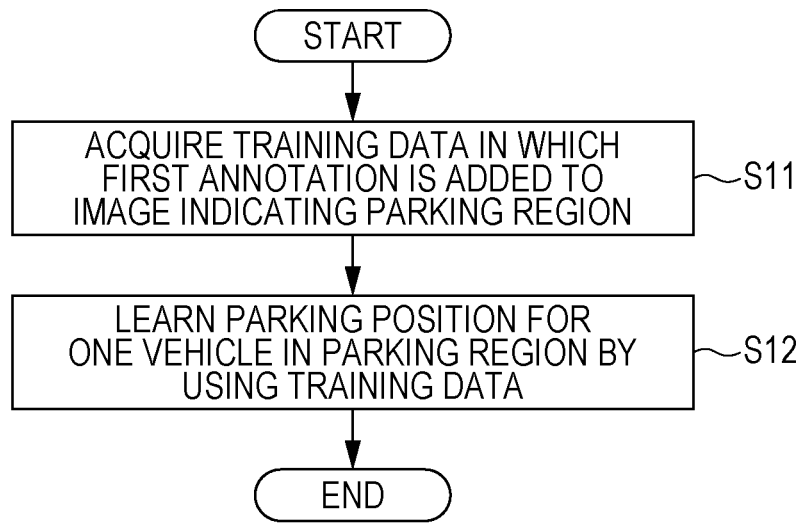
FIG. 9A is a flowchart that illustrates a parking position learning method according to one aspect of the present disclosure.

FIG. 9A is a flowchart that illustrates a parking position learning method according to one aspect of the present disclosure.

The parking position learning method according to one aspect of the present disclosure is a method in which a computer learns a parking position of a target vehicle and includes step S11 and step S12. In step S11, training data are acquired, the training data in which the first annotation as the information which indicates the parking position for one vehicle in a parking region is added to an image which indicates the parking region having the width in which at least one vehicle may be parked (that is, the training image of the embodiment). For example, the first annotation indicates the parking position for one vehicle by coordinates. In step S12, the parking position for one vehicle in the parking region is learned by using the training data, and the learning model is thereby constructed.

Figure 9B:
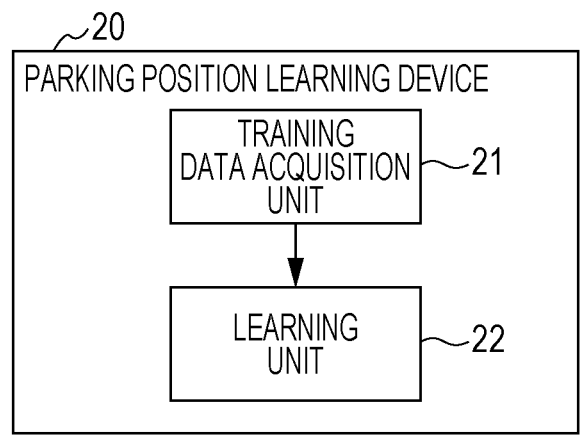
FIG. 9B is a block diagram that illustrates a function configuration of a parking position learning device according to one aspect of the present disclosure.

FIG. 9B is a block diagram that illustrates a function configuration of a parking position learning device according to one aspect of the present disclosure.

A parking position learning device 20 according to one aspect of the present disclosure is a device that learns a parking position of a target vehicle and includes a training data acquisition unit 21 and a learning unit 22. The training data acquisition unit 21 acquires training data, in which the first annotation as the information which indicates the parking position for one vehicle in a parking region is added to an image which indicates the parking region having the width in which at least one vehicle may be parked (that is, the training image of the embodiment). The learning unit 22 learns the parking position for one vehicle in the parking region by using the training data and thereby constructs the learning model.

In such parking position learning method and parking position learning device 20, learning by using the training data that include the first annotation, that is, leaning of the parking position for one vehicle in the parking region is performed, and the learning model is thereby constructed. As a result, an appropriate parking position in the parking region may be implanted in the learning model. The parking position learning method and the parking position learning device 20 that are illustrated in FIG. 9A and FIG. 9B respectively correspond to the processing action illustrated by the flowchart of FIG. 8A and the server 12 illustrated in FIG. 2 of the above embodiment.

Figure 10A:
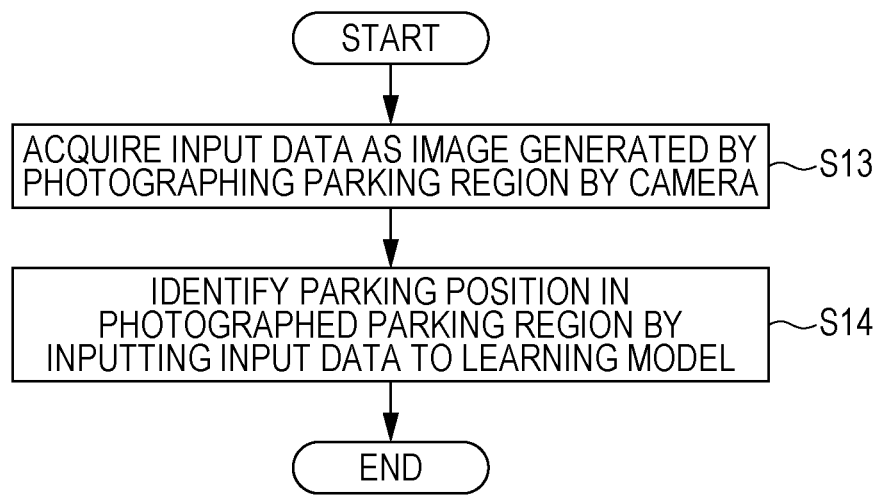
FIG. 10A is a flowchart that illustrates a parking position identification method according to one aspect of the present disclosure.

FIG. 10A is a flowchart that illustrates a parking position identification method according to one aspect of the present disclosure.

A parking position identification method according to one aspect of the present disclosure is a method in which at least one computer identifies a parking position of a target vehicle and includes step S13 and step S14. In step S13, input data as an image that is generated by photographing a parking region by a camera installed in the target vehicle are acquired. In step S14, the input data are input to a learning model, and the parking position of the target vehicle in the photographed parking region is thereby identified. The learning model indicates the relationship between the parking region that has the width in which at least one vehicle may be parked and the parking position for one vehicle in the parking region. More specifically, the learning model is constructed by acquiring training data, in which the first annotation as the information which indicates the parking position for one vehicle in the parking region is added to an image which indicates the parking region having the width in which at least one vehicle may be parked, and by learning the parking position for one vehicle in the parking region by using the training data.

Such a parking position identification method uses the learning model that is constructed by performing learning by using the training data which include the first annotation, that is, leaning of the parking position for one vehicle in the parking region. That is, an appropriate parking position in the parking region is implanted in the learning model. For example, even in a case where the parking region does not have a mark such as a white line, an appropriate parking position in the parking region is implanted. Consequently, in a case where the camera of the target vehicle photographs the parking region, the parking position of the target vehicle in the photographed parking region may appropriately be identified by using the learning model. That is, even in a case where the parking region does not have the mark such as the white line, an appropriate parking position of the target vehicle in the parking region may be identified.

Further, in acquisition of the training data, the above-described training data, in which the second annotation as the information which indicates the parking state in the parking position for one vehicle is further added to an image which indicates the parking region, may be acquired. In this case, the learning model is constructed by further learning the parking state of the vehicle in the parking region by using the training data. Further, in step S14, the input data are input to the learning model, and the parking state in the parking position of the target vehicle is further identified.

Accordingly, the learning model, which is constructed by performing learning by using the training data which include the first and second annotations, that is, leaning of the parking position for one vehicle and the parking state in the parking region, is used. That is, appropriate parking position and parking state in the parking region are implanted in the learning model. For example, even in a case where the parking region does not have the mark such as the white line, appropriate parking position and parking state in the parking region are implanted. Consequently, in a case where the camera of the target vehicle photographs the parking region, the parking position of the target vehicle and the parking state in the photographed parking region may appropriately be identified by using the learning model. That is, even in a case where the parking region does not have the mark such as the white line, appropriate parking position and parking state of the target vehicle in the parking region may be identified.

Further, in a case where the doorway obstacle that is an obstacle to getting in and out the vehicle is present in a periphery of the parking position for one vehicle in the image that indicates the parking region, the second annotation may indicate the distance between the parking position for one vehicle and the doorway obstacle as the parking state. In this case, in step S14, in a case where the input data are input to the learning model and the parking position of the target vehicle is thereby identified in a periphery of the doorway obstacle that is imaged in the input data, the distance between the doorway obstacle imaged in the input data and the parking position of the target vehicle is identified as the parking state in the parking position of the target vehicle. For example, the doorway obstacle is a vehicle that is parked next to the parking position for one vehicle in the image that indicates the parking region.

Accordingly, the distance between the parking position for one vehicle and the doorway obstacle is implanted in the learning model as the parking state. Consequently, in a case where the camera of the target vehicle photographs the parking region and the parking position of the target vehicle is identified in the periphery of the doorway obstacle, the distance between the doorway obstacle and the parking position of the target vehicle may appropriately be identified as the parking state.

Further, the above-described learning model is a neural network model, for example. Accordingly, many training data are acquired, and the accuracy of identifying an appropriate parking position may thereby be enhanced.

Figure 10B:
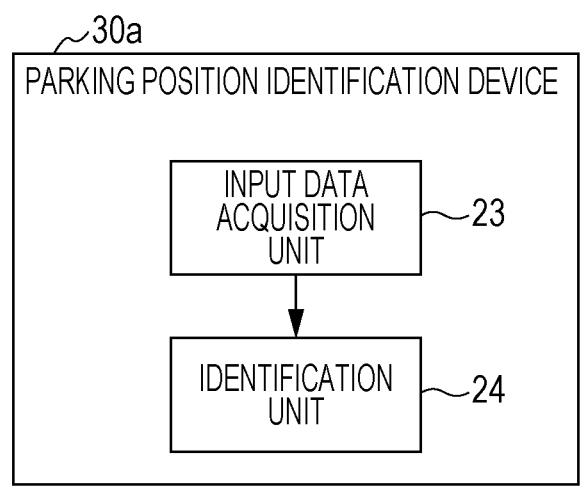
FIG. 10B is a block diagram that illustrates a function configuration of a parking position identification system according to one aspect of the present disclosure.

FIG. 10B is a block diagram that illustrates a function configuration of a parking position identification device according to one aspect of the present disclosure.

A parking position identification device 30a according to one aspect of the present disclosure is at least one computer that identifies a parking position of a target vehicle and includes an input data acquisition unit 23 and an identification unit 24.

The input data acquisition unit 23 acquires input data as an image that is generated by photographing a parking region by a camera installed in the target vehicle. The identification unit 24 inputs the input data to the learning model that indicates the relationship between the parking region which has the width in which at least one vehicle may be parked and the parking position for one vehicle in the parking region and thereby identifies the parking position of the target vehicle in the photographed parking region.

Accordingly, the parking position identification device 30a may obtain similar effects to the parking position identification method illustrated in FIG. 10A.

The parking position identification method and the parking position identification device 30a that are illustrated in FIG. 10A and FIG. 10B respectively correspond to the processing action illustrated by the flowchart of FIG. 8B and the recognizer 112 illustrated in FIG. 5 of the above embodiment.

FIG. 11A is a flowchart that illustrates a parking position identification method according to another aspect of the present disclosure.

A parking position identification method according to one aspect of the present disclosure is a method in which a system formed with at least one computer identifies a parking position of a target vehicle and includes steps S11 to S14. Steps S11 and S12 in FIG. 11A are the same processes as steps S11 and S12 illustrated in FIG. 9A, and steps S13 and S14 in FIG. 11A are the same processes as steps S13 and S14 illustrated in FIG. 10A.

In such a parking position identification method, learning by using the training data that include the first annotation, that is, leaning of the parking position for one vehicle in the parking region is performed, and the learning model is thereby constructed. As a result, an appropriate parking position in the parking region may be implanted in the learning model. For example, even in a case where the parking region does not have the mark such as the white line, an appropriate parking position in the parking region may be implanted. Consequently, in a case where the camera of the target vehicle photographs the parking region, the parking position of the target vehicle in the photographed parking region may appropriately be identified by using the learning model. That is, even in a case where the parking region does not have the mark such as the white line, an appropriate parking position of the target vehicle in the parking region may be identified.

FIG. 11B is a block diagram that illustrates a function configuration of a parking position identification system according to one aspect of the present disclosure.

A parking position identification system 30 according to one aspect of the present disclosure is a system that is formed with at least one computer which identifies a parking position of a target vehicle and includes the training data acquisition unit 21, the learning unit 22, the input data acquisition unit 23, and the identification unit 24.

The training data acquisition unit 21 and the learning unit 22 of the parking position identification system 30 are the same elements as the training data acquisition unit 21 and the learning unit 22 of the parking position learning device 20 illustrated in FIG. 9B. The input data acquisition unit 23 and the identification unit 24 of the parking position identification system 30 are the same elements as the input data acquisition unit 23 and the identification unit 24 of the parking position identification device 30a illustrated in FIG. 10B.

Accordingly, the parking position identification system 30 may obtain similar effects to the parking position identification method illustrated in FIG. 11A.

The parking position identification method and the parking position identification system 30 that are illustrated in FIG. 11A and FIG. 11B respectively correspond to the processing action illustrated by the flowcharts of FIG. 8A and FIG. 8B and the parking position identification system 10 illustrated in FIG. 1 of the above embodiment.

In the above embodiment and aspects, the elements may be realized by configuring those with dedicated hardware or by executing software programs that are suitable for the elements. A program execution unit such as a CPU or a processor reads out and executes software programs that are recorded in a recording medium such as a hard disk or a semiconductor memory, and the elements may thereby be realized. Here, the pieces of software that realize the in-vehicle apparatus 110, the server 12, the parking position learning device 20, the parking position identification device 30a, and the parking position identification systems 10 and 30 of the above-described embodiment cause a computer to respectively execute steps of the flowcharts illustrated in FIG. 8A, FIG. 8B, FIG. 9A, FIG. 10A, and FIG. 11A.

Note that cases described below are included in the present disclosure.

(1) Each of the above devices is specifically a computer system that is configured with a microprocessor, a ROM, a RAM, a hard disk unit, a display unit, a keyboard, a mouse, and so forth. The RAM or the hard disk unit stores a computer program. The microprocessor acts in accordance with the computer program, and the devices thereby achieve their functions. Here, the computer program is configured by combining plural instruction codes that indicate commands for a computer in order to achieve prescribed functions.

(2) A portion of or all elements that configure the above devices may be configured with one system large scale integration (LSI). A system LSI is a super multi-function LSI that is manufactured by integrating plural configuration parts on one chip and is specifically a computer system configured to include a microprocessor, a ROM, a RAM, and so forth. The RAM stores a computer program. The microprocessor acts in accordance with the computer program, and the system LSI thereby achieves its function.

(3) A portion of or all elements that configure the above devices may be configured with IC cards or individual modules that are removable from the devices. The IC card or the module is a computer system that is configured with a microprocessor, a ROM, a RAM, and so forth. The IC card or the module may include the above super multi-function LSI. The microprocessor acts in accordance with a computer program, and the IC card or the module thereby achieves its function. This IC card or this module may be tamper-resistant.

(4) The present disclosure may be methods described above. Further, the present disclosure may be a computer program that realizes those methods by a computer or digital signals that are configured with the computer program.

Further, in the present disclosure, the computer program or the digital signals may be recorded in computer-readable recoding media such as a flexible disk, a hard disk, a CD-ROM, an MO, a DVD, a DVD-ROM, a DVD-RAM, a Blu-ray® Disc (BD), or a semiconductor memory, for example. Further, the present disclosure may be the digital signals that are recorded in those recoding media.

Further, the present disclosure may be the computer program or the digital signals that are transmitted via an electric communication line, a wireless or wired communication line, a network represented by the Internet, data broadcasting, and so forth.

Further, the present disclosure may be a computer system that includes a microprocessor and a memory, in which the memory stores the above computer program and the microprocessor acts in accordance with the computer program.

Further, the present disclosure may be practiced by another independent computer system by transferring the recording media that record the program or the digital signals or by transferring the program or the digital signals via the network or the like.

The present disclosure enables identification of an appropriate parking position and is usable for an in-vehicle apparatus, a server, a system that includes those, and so forth, for example.

What is claimed is:

1. A parking space identification method in which at least one computer identifies a first parking space of a target vehicle, the parking space identification method comprising:
acquiring input data of an image that is generated by photographing a parking area by a camera which is installed in the target vehicle; and
identifying the first parking space of the target vehicle in the photographed parking area by inputting the input data to a learning model that indicates a relationship between a parking region which has a width in which parking of at least one vehicle is feasible and a second parking space for one vehicle in the parking region,
wherein the learning model identifies the first parking space of the target vehicle in the photographed parking area without identifying lines that serve as marks for parking vehicles in the parking region, and
the learning model is constructed by:
acquiring training data, in which a first annotation as information which indicates the second parking space for the one vehicle in the parking region is added to a second image which indicates the parking region which has the width in which parking of the least one vehicle is feasible, and in which a second annotation as information which indicates whether or not a first parking obstacle that is an obstacle to parking is present in the second parking space for the one vehicle is further added to the second image which indicates the parking region; and
learning the second parking space for the one vehicle in the parking region by using the training data, and by further learning whether or not the first parking obstacle is present in the second parking space for the one vehicle by using the training data, and
in the identifying of the first parking space of the target vehicle, the input data are input to the learning model to identify whether or not a second parking obstacle is present in the first parking space of the target vehicle.

2. The parking space identification method according to claim 1, wherein
the first annotation indicates the second parking space for the one vehicle by coordinates.

3. The parking space identification method according to claim 1, wherein
second annotation indicates whether or not the first parking obstacle that is the obstacle to parking is present in the second parking space for the one vehicle as a first parking state in the second parking space for the one vehicle, and
in the identifying of the first parking space of the target vehicle, the learning model identifies whether or not the second parking obstacle is present in the first parking space of the target as a second parking state in the first parking space of the target vehicle.

4. The parking space identification method according to claim 3, wherein
in a case where a first doorway obstacle that is the first parking obstacle to getting in and out of the one vehicle is present in a periphery of the second parking space for the one vehicle in the second image that indicates the parking region, the second annotation indicates a first distance between the second parking space for the one vehicle and the first doorway obstacle as the first parking state, and in the identifying of the first parking space of the target vehicle, in the case, the input data are input to the learning model to identify the first parking space of the target vehicle in a periphery of a second doorway obstacle that is imaged in the input data, a second distance between the second doorway obstacle that is imaged in the input data and the first parking space of the target vehicle is identified as the second parking state in the first parking space of the target vehicle.

5. The parking space identification method according to claim 4, wherein
the first doorway obstacle is a vehicle that is parked next to the second parking space for the one vehicle in the second image that indicates the parking region.

6. The parking space identification method according to claim 5, wherein
the second annotation further indicates parallel parking or side-by-side parking as the first parking state in the second parking space for the one vehicle, and
in the identifying of the first parking space of the target vehicle, the input data are input to the learning model to further identify parallel parking or side-by-side parking as the second parking state in the first parking space of the target vehicle.

7. The parking space identification method according to claim 3, wherein
the second annotation further indicates forward entrance or rearward entrance as the first parking state in the second parking space for the one vehicle, and
in the identifying of the first parking space of the target vehicle, the input data are input to the learning model to further identify forward entrance or rearward entrance as the second parking state in the first parking space of the target vehicle.

8. The parking space identification method according to claim 3, wherein
the second annotation further indicates whether or not parking is prohibited as the first parking state in the second parking space for the one vehicle, and
in the identifying of the first parking space of the target vehicle, the input data are input to the learning model to further identify whether or not parking is prohibited as the second parking state in the first parking space of the target vehicle.

9. The parking space identification method according to claim 1, wherein
the learning model is a neural network model.

10. A parking space learning method in which a computer learns a first parking space of a target vehicle, the parking space learning method comprising:
acquiring training data, in which a first annotation as information which indicates a second parking space for one vehicle in a parking region is added to an image which indicates the parking region which has a width in which parking of at least one vehicle is feasible, and in which a second annotation as information which indicates whether or not a first parking obstacle that is an obstacle to parking is present in the second parking space for the one vehicle is further added to the image which indicates the parking region; and
constructing a learning model by learning the second parking space for the one vehicle in the parking region by using the training data, and by further learning whether or not the first parking obstacle is present in the second parking space for the one vehicle by using the training data,
wherein the learning model identifies the first parking space of the target vehicle without identifying lines that serve as marks for parking vehicles in the parking region, and
the learning model identifies whether or not a second parking obstacle is present in the first parking space of the target vehicle.

11. A parking space identification device that identifies a first parking space of a target vehicle, the parking space identification device comprising:
a processor; and
a memory that stores at least one program that, when executed by the processor, causes the processor to perform operations including:
acquiring input data of an image which is generated by photographing a parking area by a camera which is installed in the target vehicle; and
identifying the first parking space of the target vehicle in the photographed parking area by inputting the input data to a learning model which indicates a relationship between a parking region which has a width in which parking of at least one vehicle is feasible and a second parking space for one vehicle in the parking region,
wherein the learning model identifies the first parking space of the target vehicle in the photographed parking area without identifying lines that serve as marks for parking vehicles in the parking region, and
the learning model is constructed by:
acquiring training data, in which a first annotation as information which indicates the second parking space for the one vehicle in the parking region is added to a second image which indicates the parking region which has the width in which parking of the at least one vehicle is feasible, and in which a second annotation as information which indicates whether or not a first parking obstacle that is an obstacle to parking is present in the second parking space for the one vehicle is further added to the second image which indicates the parking region; and
learning the second parking space for the one vehicle in the parking region by using the training data, and by further learning whether or not the first parking obstacle is present in the second parking space for the one vehicle by using the training data, and
in the identifying of the first parking space of the target vehicle, the input data are input to the learning model to identify whether or not a second parking obstacle is present in the first parking space of the target vehicle.

12. A parking space identification system that identifies a first parking space of a target vehicle, the parking space identification system comprising:
a processor; and
a memory that stores at least one program that, when executed by the processor, causes the processor to perform operations including:
acquiring training data, in which a first annotation as information which indicates a second parking space for one vehicle in a parking region is added to a second image which indicates the parking region which has a width in which parking of at least one vehicle is feasible, and in which a second annotation as information which indicates whether or not a first parking obstacle that is an obstacle to parking is present in the second parking space for the one vehicle is further added to the second image which indicates the parking region;

constructing a learning model by learning the second parking space for the one vehicle in the parking region by using the training data, and by further learning whether or not the first parking obstacle is present in the second parking space for the one vehicle by using the training data;

acquiring input data of a first image which is generated by photographing a parking area by a camera which is installed in the target vehicle; and identifying the first parking space of the target vehicle in the photographed parking area by inputting the input data to the learning model, wherein the learning model identifies the first parking space of the target vehicle in the photographed parking area without identifying lines that serve as marks for parking vehicles in the parking region, and in the identifying of the first parking space of the target vehicle, the input data are input to the learning model to identify whether or not a second parking obstacle is present in the first parking space of the target vehicle.

13. A parking space learning device that learns a first parking space of a target vehicle, the parking space learning device comprising:

a processor; and a memory that stores at least one program that, when executed by the processor, causes the processor to perform operations including:

acquiring training data, in which a first annotation as information which indicates a second parking space for one vehicle in a parking region is added to an image which indicates the parking region which has a width in which parking of at least one vehicle is feasible, and in which a second annotation as information which indicates whether or not a first parking obstacle that is an obstacle to parking is present in the second parking space for the one vehicle is further added to the image which indicates the parking region; and constructing a learning model by learning the second parking space for the one vehicle in the parking region by using the training data, and by further learning whether or not the first parking obstacle is present in the second parking space for the one vehicle by using the training data, wherein the learning model identifies the first parking space of the target vehicle without identifying lines that serve as marks for parking vehicles in the parking region, and the learning model identifies whether or not a second parking obstacle is present in the first parking space of the target vehicle.

14. A computer-readable non-transitory recording medium that records a program of learning a first parking space of a target vehicle, the program being executable by a computer and causing the computer to execute a method, the method comprising:

acquiring training data, in which a first annotation as information which indicates a second parking space for one vehicle in a parking region is added to an image which indicates the parking region which has a width in which parking of at least one vehicle is feasible, and in which a second annotation as information which indicates whether or not a first parking obstacle that is an obstacle to parking is present in the second parking space for the one vehicle is further added to the image which indicates the parking region; and constructing a learning model by learning the second parking space for the one vehicle in the parking region by using the training data, and by further learning whether or not the first parking obstacle is present in the second parking space for the one vehicle by using the training data, wherein the learning model identifies the first parking space of the target vehicle without identifying lines that serve as marks for parking vehicles in the parking region, and the learning model identifies whether or not a second parking obstacle is present in the first parking space of the target vehicle.

* * * * *